United States Patent
Nielson

(10) Patent No.: US 9,250,395 B2
(45) Date of Patent: Feb. 2, 2016

(54) CONNECTOR FOR MULTIPLE CORE OPTICAL FIBER

(71) Applicant: CommScope, Inc. of North Carolina, Hickory, NC (US)

(72) Inventor: Jeffrey D. Nielson, Longmont, CO (US)

(73) Assignee: CommScope, Inc. of North Carolina, Hickory, NC (US)

( * ) Notice: Subject to any disclaimer, the term of this patent is extended or adjusted under 35 U.S.C. 154(b) by 48 days.

(21) Appl. No.: 14/303,551

(22) Filed: Jun. 12, 2014

(65) Prior Publication Data

US 2014/0369648 A1    Dec. 18, 2014

Related U.S. Application Data

(60) Provisional application No. 61/834,796, filed on Jun. 13, 2013.

(51) Int. Cl.
G02B 6/36    (2006.01)
G02B 6/38    (2006.01)

(52) U.S. Cl.
CPC .......... G02B 6/3871 (2013.01); G02B 6/3821 (2013.01)

(58) Field of Classification Search
CPC combination set(s) only.
See application file for complete search history.

(56) References Cited

U.S. PATENT DOCUMENTS

| | | | |
|---|---|---|---|
| 4,854,664 A * | 8/1989 | McCartney | G02B 6/3825 385/59 |
| 5,129,023 A * | 7/1992 | Anderson | G02B 6/3831 385/60 |
| 5,734,773 A | 3/1998 | Teshima et al. | |
| 6,154,594 A | 11/2000 | Fiacco et al. | |
| 6,155,146 A | 12/2000 | Andrews et al. | |
| 7,147,384 B2 | 12/2006 | Hardcastle et al. | |
| 7,548,674 B1 | 6/2009 | Horibe et al. | |
| 7,604,417 B2 | 10/2009 | Nielson et al. | |
| 7,625,129 B2 | 12/2009 | Nielson et al. | |
| 8,038,354 B2 | 10/2011 | Nielson et al. | |
| 8,175,431 B2 | 5/2012 | Imada et al. | |
| 8,529,138 B2 | 9/2013 | Duis et al. | |
| 2002/0085815 A1 | 7/2002 | Shinagawa et al. | |
| 2004/0105625 A1 | 6/2004 | Ueda et al. | |
| 2004/0189321 A1 | 9/2004 | Drexler et al. | |
| 2005/0210169 A1 | 9/2005 | Chou | |
| 2011/0229085 A1 | 9/2011 | Bradley et al. | |
| 2011/0229086 A1 | 9/2011 | Bradley et al. | |
| 2011/0274398 A1 | 11/2011 | Fini et al. | |
| 2012/0219255 A1 | 8/2012 | Bradley et al. | |
| 2013/0044978 A1 | 2/2013 | DeDobbelaere et al. | |
| 2013/0163072 A1 | 6/2013 | Chang et al. | |
| 2013/0251320 A1 | 9/2013 | Hayashi | |

* cited by examiner

*Primary Examiner* — Hemang Sanghavi
(74) *Attorney, Agent, or Firm* — Muncy, Geissler, Olds & Lowe, P.C.

(57) ABSTRACT

A fiber optic plug, suitable for multi-core fiber (MCF), is structured to hold satellite cores of the MCF in a precise angular positions so as to attain suitable alignment with satellite cores of a mating connector. The plug includes features to permit a ferrule holding the MCF to move longitudinally relative to the connector's housing, so that a spring may control a mating force to an abutting ferrule of a mating connector. The ferrule may be held by ferrule barrel having splines projecting away from an outer peripheral surface. The splines may slide longitudinally within notches of the connector housing or a strength member attached to the connector housing. The notches and splines have a tight tolerance, so that the satellite cores remain in a desired, set angular position.

20 Claims, 16 Drawing Sheets

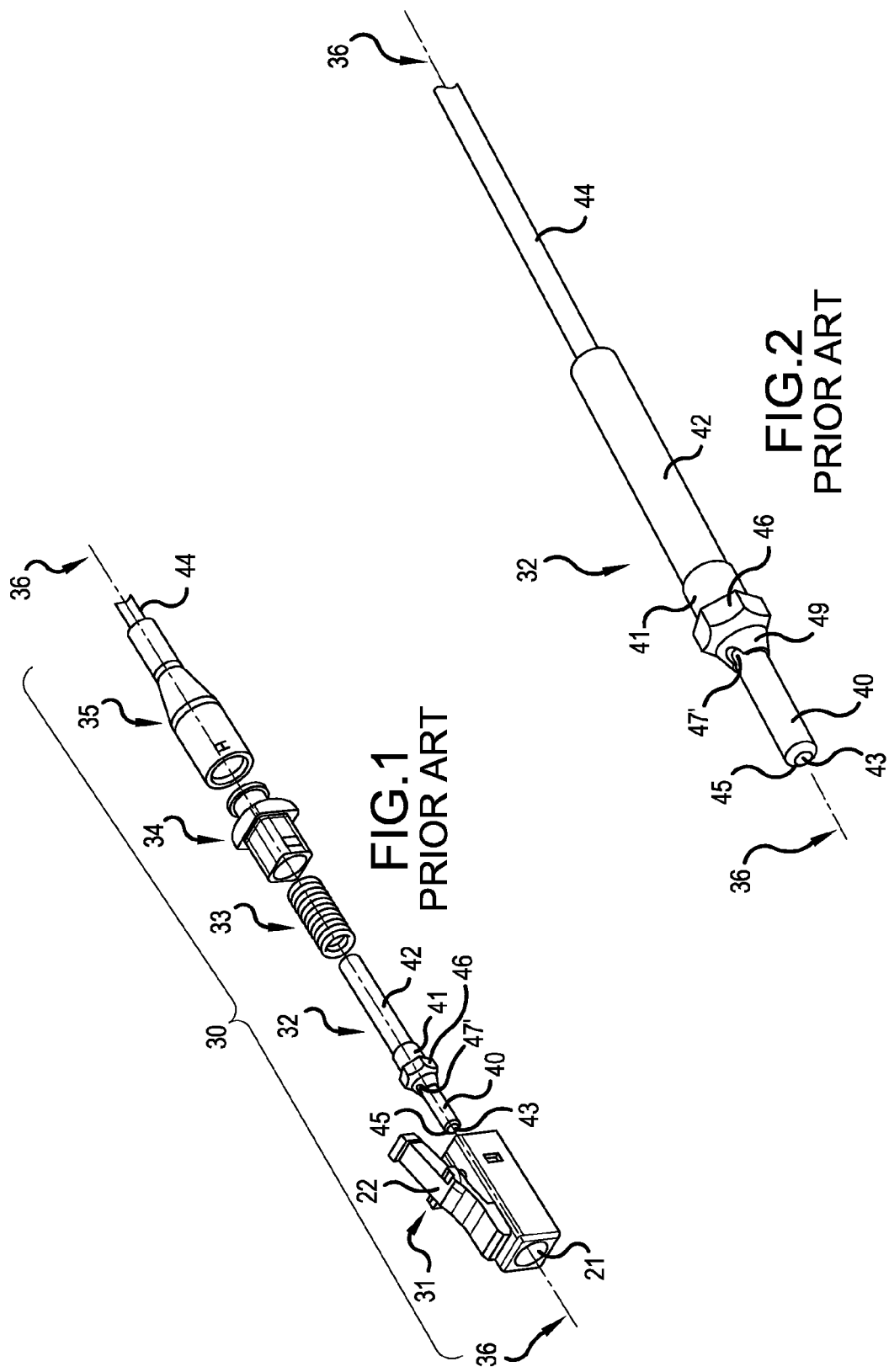

CONNECTOR FOR MULTIPLE CORE OPTICAL FIBER

This application claims the benefit of U.S. Provisional Application No. 61/834,796, filed Jun. 13, 2013, which is herein incorporated by reference.

BACKGROUND OF THE INVENTION

1. Field of the Invention

The present invention relates to a fiber optic connector. More particularly, the present invention relates to a fiber optic connector, which enables precise alignment of the cores of a multi-core fiber end presented by the fiber optic connector relative to a feature of the connector envelope or a feature attached to the ferrule of the fiber optic connector, while enabling the ferrule to reciprocate longitudinally within the connector envelope.

2. Description of the Related Art

FIG. 1 shows an exploded view of a simplex connector, in the form of an LC connector 30, in accordance with the prior art. The LC connector 30 comprises the following components, from left to right: plug housing 31; ferrule subassembly 32; spring 33; extender 34; and buffer boot 35. For the purposes of the present discussion, the adjectives "front" and "lead" refer to the plug end of a connector (i.e., the left side of FIG. 1). The adjectives "rear" and "tail" refer to the boot end of a connector (i.e., the right side of FIG. 1). Components 31-35 share a common longitudinal axis 36.

In the assembled connector 30, the ferrule subassembly 32 with the cable end mounted thereto, "floats" along longitudinal axis 36 within an enclosure comprising plug housing 31, extender 34, and buffer boot 35. Spring 33 provides spring-loading of the ferrule subassembly 32 within the enclosure, such that the ferrule subassembly 32 is biased toward the front end of plug housing 31. Boot 35 relieves mechanical strain on an optical fiber cable 44.

Ferrule subassembly 32 includes a ferrule 40, a ferrule holder 41 (sometimes referred to as a ferrule barrel), and tubing 42. The ferrule 40 has a precision hole extending down its length, along axis 36. The hole is shaped to closely receive a bare optical fiber from a stripped end of the optical fiber cable 44. The bare fiber is trimmed at the ferrule tip 45 and polished, resulting in an exposed fiber end face 43. Ferrule holder 41 includes a hexagonal flange 46 and a front cone portion 49 having a pair of slots 47, 47' in its perimeter. The details of the slots 47, 47' and exposed fiber end face 43 are best seen in the close-up perspective view of the ferrule subassembly 32 shown in FIG. 2.

When connector 30 is fully assembled, the ferrule tip 45 is accessible through an opening 21 at the front of the plug housing 31. The plug housing 31 includes a latch arm 22 that is used to releasably attach the connector 30 into a corresponding socket or jack (not shown).

As best seen in FIG. 3, when connector 30 is fully assembled, the hexagonal flange 46 is seated in a corresponding hexagonal cavity 23 within plug housing 31, thereby limiting rotation of the flange/ferrule assembly 32 around axis 36.

FIG. 4 shows a perspective view of a tuning wrench 50 that can be used to rotate the ferrule subassembly 32 around its longitudinal axis 36 in an assembled connector 30. The ferrule subassembly 32 can be rotated in order to improve core alignment, as will be discussed in relation to FIG. 5. As shown in FIG. 4, the tuning wrench 50 includes a hollow shaft 51 having an opening 52 therein that fits through the plug housing opening 21 and around the ferrule 40. Teeth 53, 53' engage the pair of slots 47, 47' in the front cone portion 49 of the ferrule holder 41.

In use, the tuning wrench 50 pushes the ferrule subassembly 32 along its longitudinal axis 36 toward the tail end of the assembled connector 30, such that spring 33 is compressed, and such that hexagonal flange 46 is unseated from its receiving cavity 23 in plug housing 31. Once the hexagonal flange 46 is unseated, the ferrule subassembly 32 can then be freely rotated clockwise or counter-clockwise around its longitudinal axis 36. Releasing the tuning wrench 50 causes the hexagonal flange 46 to be reseated in its receiving cavity 23. It will be appreciated that the ferrule subassembly 32 can only be rotated to one of six orientations (i.e., sixty degree positional tuning) relative to the plug housing 31, corresponding to the six possible engagement locations of the hexagonal flange 46 within the corresponding hexagonal cavity 23 of the plug housing 31.

FIG. 5 illustrates the six potential placements 43A-43F of the exposed fiber end face 43. The reason the exposed fiber end face 43 is not always dead center is due to manufacturing tolerances in getting the fiber core 12 centered in the cladding layer 16, and/or an off-center or canted hole extending down the length of the ferrule 40, and/or the hole in the ferrule 40 is oversized to allow for the epoxy adhering the optical fiber into the hole, and the epoxy is not forming an even layer around the optical fiber within the hole.

Therefore, is it commonly known to view and/or detect the end face 43 of the optical fiber and use the tuning wrench 50 to select the one position, shown in bold with reference numeral 43E, out of the six potential positions 43A-43F, which best places the fiber core 12 of the exposed fiber end face 43 in the center of the opening 21 of the plug housing 31. Alternatively the fiber core can be positioned closest to a preferred location, for example 12 o'clock, to maximize transmission between two coupled connectors. The best positioning of the end face 43, e.g., the position which best minimizes the eccentric error, may also be determined with resort to a light measuring detector, which measures the intensity of light being received from the center of the connector end. More details concerning the correction of the eccentric error can be found in US Published Application 2002/0085815, which is herein incorporated by reference.

As can be seen in FIG. 3, the fit between the hexagonal flange 46 and the corresponding hexagonal cavity 23 of the plug housing 31 has significant play 60, 61. A typical hexagon flange 46 has a width dimension of X, e.g., 2.80 mm, while a typical hexagonal cavity 23 within the plug housing 31 has a width of Y, e.g., 3.07 mm. Based upon these measurements, Applicants have evaluated the play and found that the hexagonal flange 46 may rotated up to +/−twelve degrees within the hexagonal cavity 23 of the plug housing 31. The +/−play is represented by the doubled headed arrows 60 and 61 in FIG. 3. Such play has been acceptable in the art, wherein the optic fiber 43 presented a single core 12 transmitting light. As one could typically select one of the potential six positions, e.g., a sixty degree optimization, and minimize the eccentric error to a level producing acceptable dB loss across a mated pair of connectors, and the +/−additional twelve degree of play did not greatly deteriorate the dB loss across the mated pair of connectors.

A current development in the fiber arts is the multi-core optical fiber 43'. As shown in FIG. 6, the multi-core optical fiber 43' presents multiple cores 12a-12g within a single cladding layer 16. The depiction of FIG. 6 shows a center core 12a and six satellite cores 12b-12g.

When a first multi-core optical fiber connector 30 mates with a second multi-core optical fiber connector 30A, it is important that each core 12a-12g of the first multi-core optical fiber connector 30 comes into alignment with each core 12a-12g of the second multi-core optical fiber connector 30A. Therefore, the play 60 and 61 depicted in FIG. 3 is not acceptable. A plus or minus twelve degree shift could allow the satellite cores 12b-12g to be completely offset and out of communication when a first multi-core optical fiber connector 30 is mated to a second multi-core optical fiber connector 30A via a pass through adapter.

To address this concern, the prior art of US Published Application 2011/0229085, which is herein incorporated by reference, has reduced the allowable tolerances between the hexagonal flange 46 of the ferrule holder 41 and the hexagonal cavity 23 of the plug housing 31. In US Published Application 2011/0229085, "a tightly toleranced internal hexagonal cavity" is employed, as it is important that the shape geometry employed on the collar of the ferrule holder "match" the shape geometry employed in the internal plug housing. Excessive play, e.g., +/−twelve degrees, would not be acceptable.

In US Published Application 2011/0229085, the external geometry of the ferrule holder, e.g., the hexagonal flange 46, is tightly seated without play into the internal geometry of the plug housing, e.g., the hexagonal cavity 23, relatively rotatable parts of the connector which could effect the angular placement of the satellite cores 12b-12g are preferably locked down in place with epoxy.

SUMMARY OF THE INVENTION

The Applicant has appreciated drawbacks in the multi-core fiber optic connectors of the prior art. It is an object of the present invention to address one or more of the drawbacks and other perceived needs in the art.

It is appreciated that precision molding of the internal cavity of the plug housing is difficult and increases the costs. Plug housings with out-of-tolerance internal cavities would need to be recycled. Further, the plastic portions of the housing can be subject to abrasion and may over time expand to develop play in the nesting between the external geometry of the ferrule holder and the internal geometry of the plug housing, which could lead to degraded communication performance in one or more cores. Also, the entire plug housing may slightly rotate about its central axis within a port of an adapter because of a clearance fit between the plug's housing and the walls of the port. Also, the mating force between ferrules is produced by a spring and relies on a clearance fit between the ferrule holder and connector housing. An interference fit or bonded fit between the ferrule holder and housing can increase or decrease the force between mated connectors, especially when manufacturing tolerances along the axis of the connector system vary.

It is an object of the present invention to provide a low cost dependable fiber optic plug, suitable for multi-core optical fibers, whereby the satellite cores of a multi-core fiber are held in a proper angular position by a ferrule so as to attain suitable alignment with the satellite cores of a mating connector, while permitting the ferrule to move longitudinally relative to the connector housing, so that a spring may control a mating force to an abutting ferrule of a mating connector.

These and other objects are accomplished by new plug or connector structures. The connector structures may hold the satellite fibers in a more precise alignment than achievable in the prior art connector structures, while also permitting the ferrule to move longitudinally relative to the connector housing. Also, the new connector structures may operate in conjunction with a tabbed sleeve, as described in the Applicant's co-pending U.S. patent application Ser. No. 14/161,792, filed Jan. 23, 2014, which is incorporated herein by reference.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 1 is an exploded, perspective view of an LC connector for an optical fiber, in accordance with the prior art;

FIG. 2 is a close-up, perspective view of a ferrule subassembly in FIG. 1;

DETAILED DESCRIPTION OF EMBODIMENTS OF THE INVENTION

Figure 3:
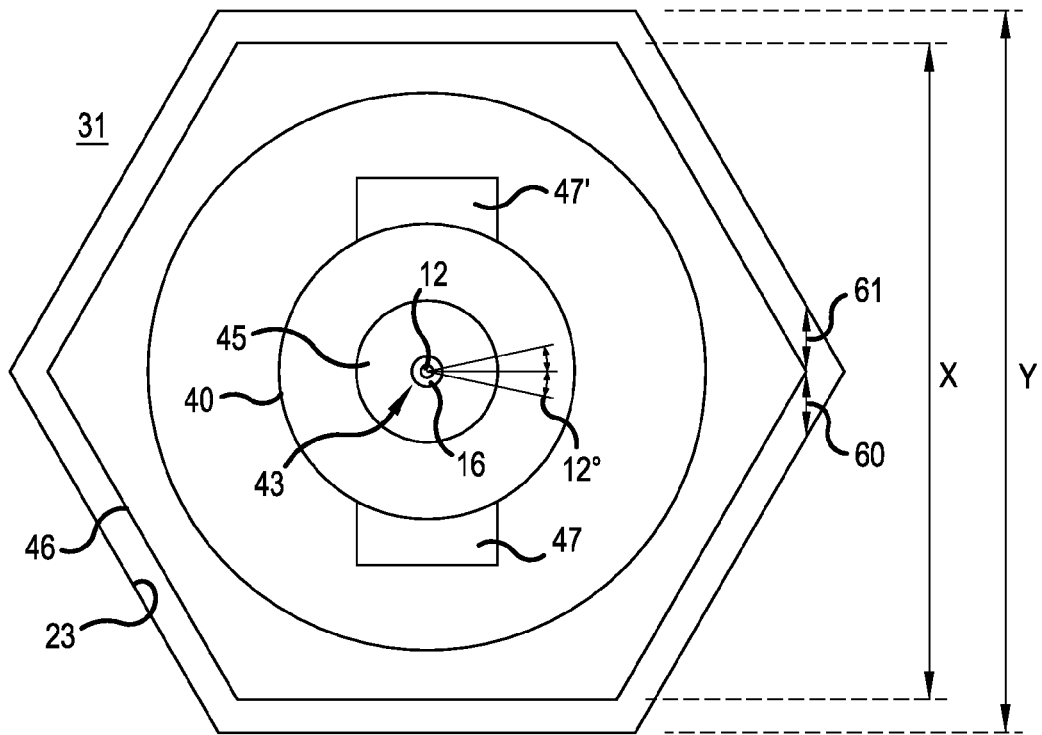
FIG. 3 is a diagram depicting play in the fitting of a hexagonal flange of a ferrule holder within a hexagonal cavity of a plug housing, in accordance with the prior art.
Figure 4:
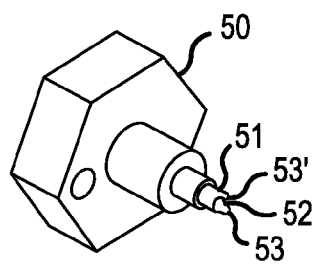
FIG. 4 is a perspective view of a tuning wrench, in accordance with the prior art.
Figure 5:
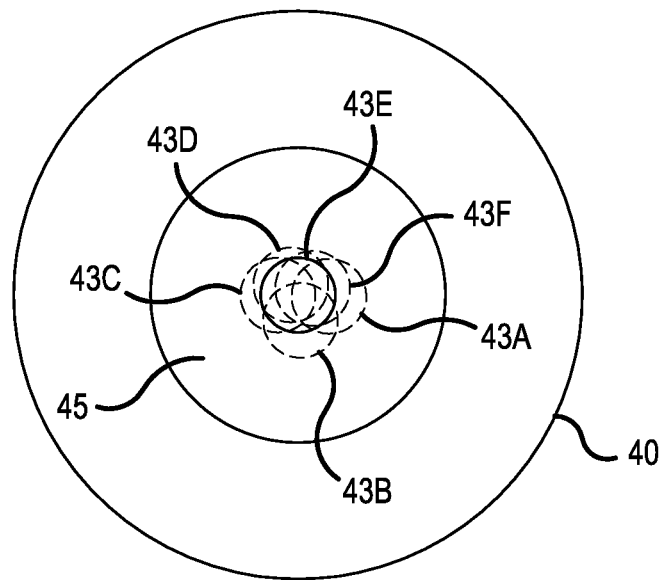
FIG. 5 is a diagram depicting six potential locations of a fiber end presented by a fiber optical connector due to an eccentric error in the fiber placement, in accordance with the prior art.
Figure 6:
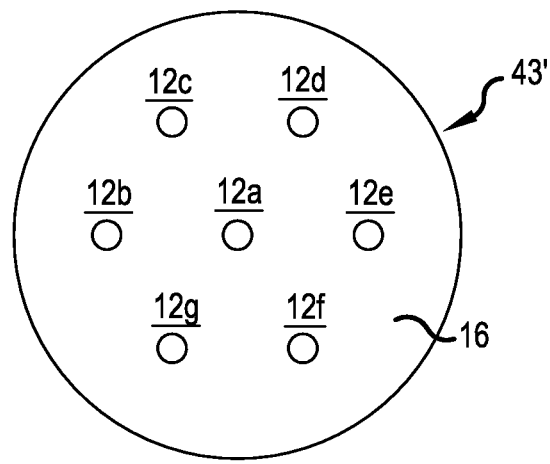
FIG. 6 is an end view of a multi-core optical fiber, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Fiber optic jumpers, patch cords, trunk cables, fanouts and other cable configurations provide optical connectivity in numerous spaces including LANs, WANs, Datacenters, vehicles, aircraft and ships. Historically, all have used one or more single core optical fibers. New optical fibers with multiple optical cores are in development. The multiple optical cores are often arranged in polar arrays with one central core surrounded by multiple satellite cores, all at the same radial distance from the central core. Other core arrangements, including polar arrays with cores located on multiple radii and hexagonal arrays are less common. Connectors that control the angular position and angular rotation of the multiple core fibers are needed to form low cost, low loss connections.

In most existing single fiber connectors, optical fiber is bonded into a ferrule which floats under spring force within a connector housing. The angular fiber/ferrule rotation has not been tightly controlled in current designs. Many connectors allow +/−12 degrees of rotation. A multi-core fiber (MCF) with 33 micron diameter satellite cores located on a 58 micron radius would align only 88% of the satellite core area if each fiber were rotated 3 degrees in opposite directions. A maximum angular alignment of +/−0.75 degrees would need to be maintained to adequately align single mode (SM) MCF with eight micron diameter satellites on a 34 micron radius. Connectors that tightly control angular fiber rotation are needed in the art.

The following connectors are designed to tightly control the angular rotation of MCF. Each connector design has unique characteristics. Some designs are simple and require the fiber to be clocked before the fiber is bonded to the ferrule. Others connector designs contain more pieces that allow the fiber to be clocked after the fiber has been bonded to the ferrule. Still other connector designs allow the fiber to be clocked after it is bonded to the ferrule and also allow the connector to couple to a tabbed sleeve for additional alignment control. The unique features found in the separate designs can be combined in different ways to form additional connector designs, which are considered part of the scope of this patent.

Figure 7:
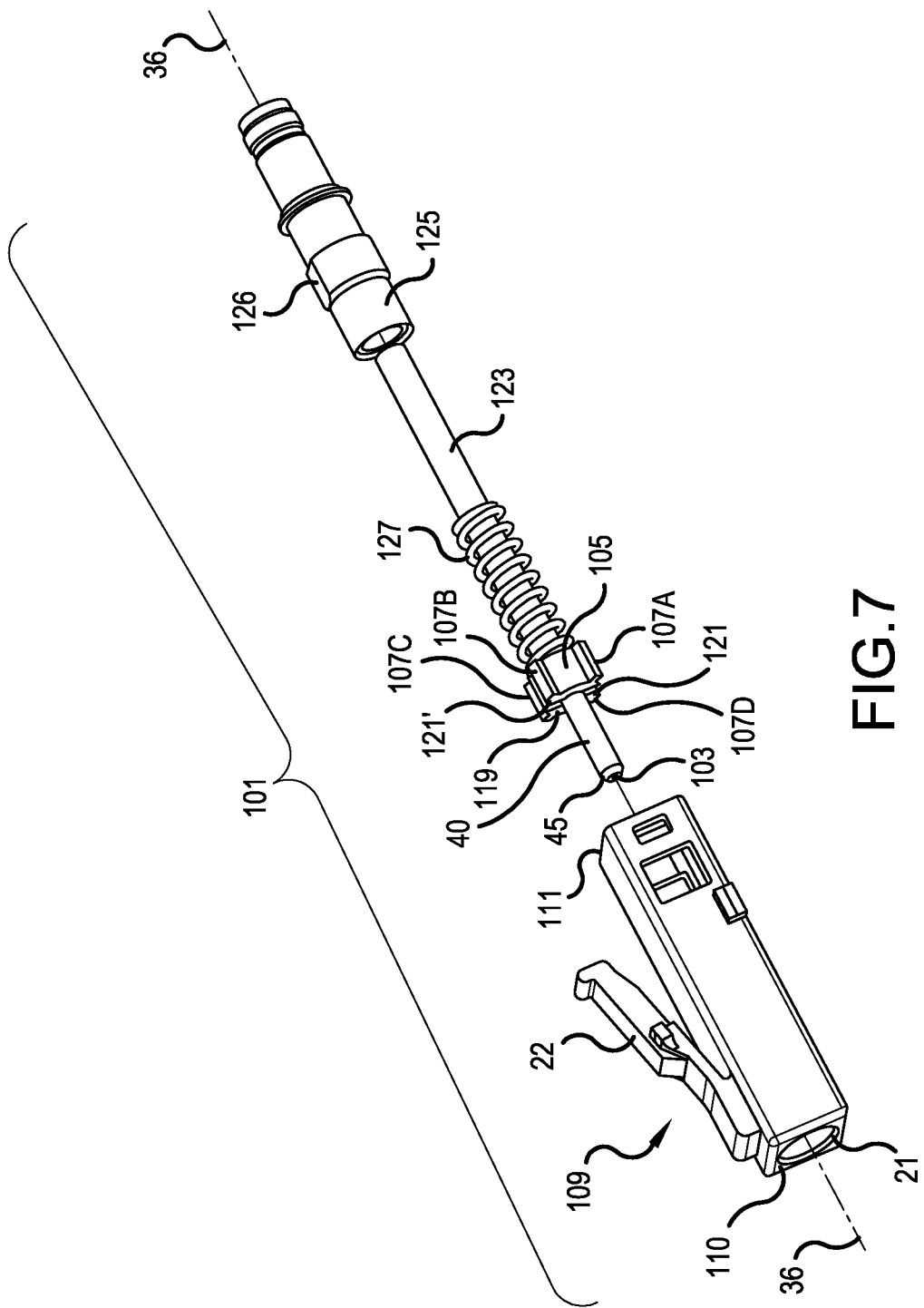
FIG. 7 is an exploded, perspective view of a first connector for an optical fiber, in accordance with a first embodiment of the present invention.

FIG. 7 is an exploded, perspective view of a first multi-core fiber (MCF) connector 101, in accordance with a first embodiment of the present invention. Structures, which are the same or similar to the prior art depicted in FIGS. 1-3 have been labeled by a same reference numeral. The first MCF fiber connector 101 includes a ferrule 40, which is cylindrical in shape. A multi-core fiber 103 is secured within a central bore of the ferrule 40, e.g., by epoxy. A ferrule barrel 105 surrounds at least a portion of the ferrule 40, and may be attached to the ferrule 40 by epoxy or by a press fit.

The ferrule barrel 105 includes at least one spline 107 extending away from an outer peripheral surface of the ferrule barrel 105. In a preferred embodiment, the at least one spline 107 includes four splines 107A, 107B, 107C and 107D, each extending away from the outer peripheral surface of the ferrule barrel 105, and the four splines 107A, 107B, 107C and 107D are equally spaced around the peripheral surface of the ferrule barrel 105 at intervals of ninety degrees.

Figure 8:
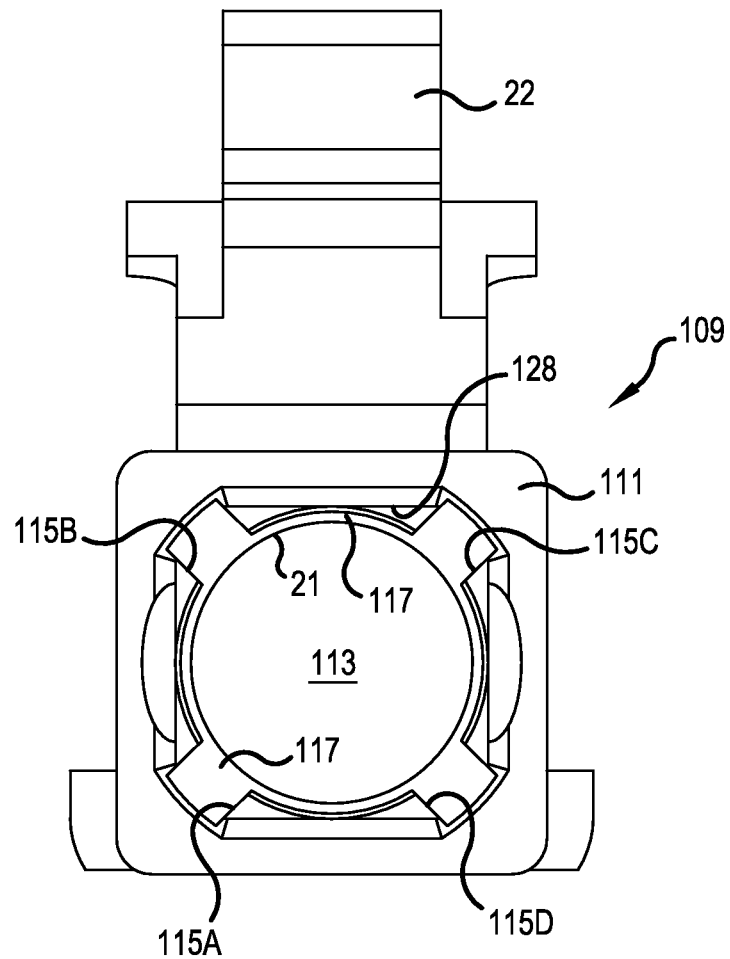
FIG. 8 is a rear view of an empty connector housing depicted in FIG. 7.

As best seen in FIG. 8, a connector housing 109 has a rear face 111 with an opening to an inner cavity 113. FIG. 8 depicts the inner cavity 113 as empty, and leading up to the opening 21 in a front face 110 of the connector housing 109. The inner cavity 113 is sized to accept the ferrule barrel 105, which when fully inserted abuts to a ridge or ledge 117 located at some depth within the cavity 113 (but not necessarily directly behind the front face 110 of the connector housing 109), so that the ferrule barrel 105 cannot pass entirely through the cavity 113 and out the opening 22.

The inner cavity 113 includes at least one notch 115 on its inner periphery, such as four notches 115A, 115B, 115C and 115D equally spaced ninety degrees apart around the inner periphery of the cavity 113. The notches 115A, 115B, 115C and 115D are sized to receive the splines 107A, 107B, 107C and 107D and to permit the splines 107A, 107B, 107C and 107D to move within the notches 115A, 115B, 115C and 115D in a first direction which is substantially parallel to an extension direction of the ferrule 40, e.g., parallel to the axis 36. In a preferred embodiment, a width of each notch 115 is not more than 0.003 inches greater than a width of each spline 107, so as to permit longitudinal, reciprocal movement of the ferrule barrel 105 relative to the connector housing 109 along the axis 36 passing through the center of ferrule 40, and so as to limit rotation of the ferrule barrel 105 around the axis 36 to less than +/−2.3 degrees relative to the connector housing 109, translating to +/−2.2 um translation at the satellite cores of the MCF 103.

In a preferred embodiment, a front face 119 of the ferrule barrel 105 lies in a plane, which is substantially perpendicular to the axis 36 or extension direction of the ferrule 40. The front face 119 includes first and second recessed portions 121 and 121' to receive a tab of a sleeve in an adapter. In a preferred embodiment, the cores of the multi-core fiber 103 are clocked relative to an edge of the recessed portions 121 and 121' prior to the multi-core fiber 103 being bonded within the ferrule 40. Details concerning clocking the cores of the multi-core fiber 103 to an edge of one of the recessed portions 121 or 121', and details concerning the tabbed sleeve of an adapter using the recessed portions 121 and 121' for satellite core alignment between mating connectors within the adapter can be found in Applicant's co-pending U.S. application Ser. No. 14/161,792, filed Jan. 23, 2014, which is herein incorporated by reference.

In a preferred embodiment, the first MCF fiber connector 101 further includes a tube 123 surrounding the multi-core fiber 103 to the rear of the ferrule barrel 105. An extender 125 loosely surrounds the tube 123. A spring 127 surrounds the tube 123 and resides between a backside of the ferrule barrel 105 and a forward face of the extender 125. The spring 127 biases the ferrule barrel 105 away from the extender 125.

The extender 125 has an indexing feature 126 to align it with a mating feature 128 on the backside 111 of the connector housing 109. The front of the extender 125 gets inserted into the cavity 113 and is adhered to a portion of the inner cavity 113 of the connector housing 109. Therefore, the spring 127 tends to push the front face 119 of the ferrule barrel 105 into contact with the ledge 117. The spring 127 can be compressed when the ferrule tip 45 is contacted by another ferrule tip of a mating connector, thereby permitting the front face 119 of the ferrule barrel 105 to leave the ledge 117.

Figure 9:
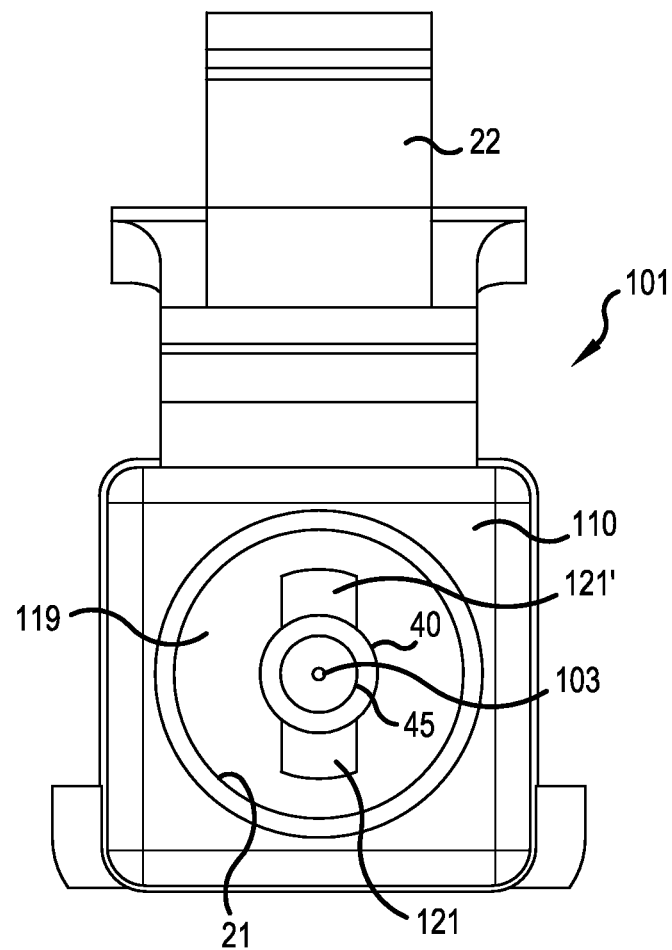
FIG. 9 is a front view of the connector housing of FIGS. 7 and 8 with a ferrule assembly of FIG. 7 installed in the connector housing.

FIG. 9 is a front view of the connector housing 109 and best illustrates the front face 119 of the ferrule barrel 105 when fully seated into the cavity 113, i.e., in abutment with the ledge 117 within the cavity 113. The recessed portions 121 and 121' are accessible through the opening 21 in the front face 110 of the connector housing 109, and can be engaged by a tab of a tabbed alignment sleeve within an adapter, as noted above, to provide precise rotational alignment in the mating of satellite cores while still enabling the ferrule 40 to be pressed rearwardly into the connector housing 109.

Although FIGS. 7-9 have depicted the connector housing 109 as defining an LC type connector envelope, the connector housing 109 may take other forms like SC or ST type connector housings. This substitution of connector housing features is applicable to all embodiments of the present application.

Figure 10:
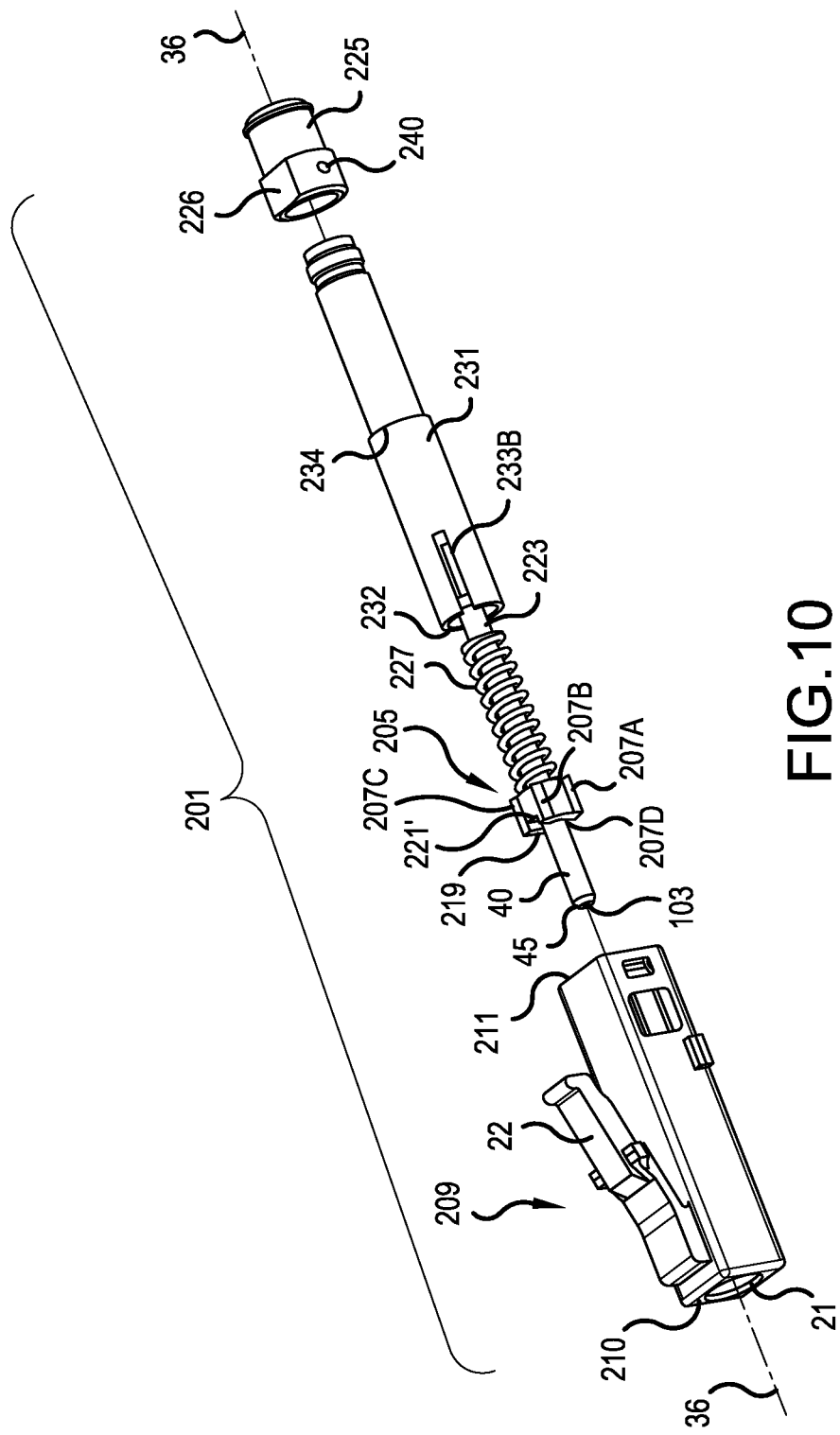
FIG. 10 is an exploded, perspective view of a second connector for an optical fiber, in accordance with a second embodiment of the present invention.

FIG. 10 is an exploded, perspective view of a second MCF connector 201, in accordance with a second embodiment of the present invention. Structures, which are the same or similar to the prior art or earlier embodiments, have been labeled by a same reference numeral. The second MCF fiber connector 201 includes a ferrule 40, which is cylindrical in shape. A multi-core fiber 103 is secured within a central bore of the ferrule 40, e.g., by epoxy. A ferrule barrel 205 surrounds at least a portion of the ferrule 40, and may be attached to the ferrule 40 by epoxy or by a press fit.

The ferrule barrel 205 includes at least one spline 207 extending away from an outer peripheral surface of the ferrule barrel 205. In a preferred embodiment, the at least one spline 207 includes four splines 207A, 207B, 207C and 207D, each extending away from the outer peripheral surface of the ferrule barrel 205, and the four splines 207A, 207B, 207C and 207D are equally spaced around the peripheral surface of the ferrule barrel 205 at intervals of ninety degrees.

A strength member 231 surrounds the multi-core fiber 103 to a rear of the ferrule barrel 205. The strength member 231 is a generally tubular member and includes at least one notch 233 for receiving the at least one spline 207. For example, the strength member 231 may include four notches 233A, 233B, 233C and 233D, equally spaced, ninety degrees apart and extending through the outer peripheral surface of the strength member 231 up to a front face 232 of the strength member 231.

The notches 233A, 233B, 233C and 233D are sized to receive the splines 207A, 207B, 207C and 207D and to permit the splines 207A, 207B, 207C and 207D to move within the notches 233A, 233B, 233C and 233D in a first direction, which is substantially parallel to an extension direction of the ferrule 40, e.g., parallel to the axis 36. In a preferred embodiment, a width of each notch 233 is not more than 0.002 inches greater than a width of each spline 207, so as to permit reciprocal longitudinal movement of the ferrule barrel 205 along the axis 36 passing through the center of ferrule 40 relative to the strength member 231, and so as to limit rotation of the ferrule barrel 205 around the axis 36, translating to no more than +/−1.25 um translation at satellite cores.

In a preferred embodiment, a front face 219 of the ferrule barrel 205 lies in a plane, which is substantially perpendicular to the axis 36 or extension direction of the ferrule 40. The front face 219 includes first and second recessed portions 221 and 221' to receive a tab of a sleeve in an adapter. In a preferred embodiment, the cores of the multi-core fiber 103 are clocked relative to an edge of the recessed portions 221 and 221' prior to the multi-core fiber 103 being bonded within the ferrule 40. Again, details concerning clocking the cores of the multi-core fiber 103 to an edge of one of the recessed portions 221 or 221', and details concerning the sleeve of an adapter using the recessed portions 221 and 221' for satellite core alignment between mating connectors within the adapter can be found in Applicant's co-pending U.S. application Ser. No. 14/161,792.

Figure 11:
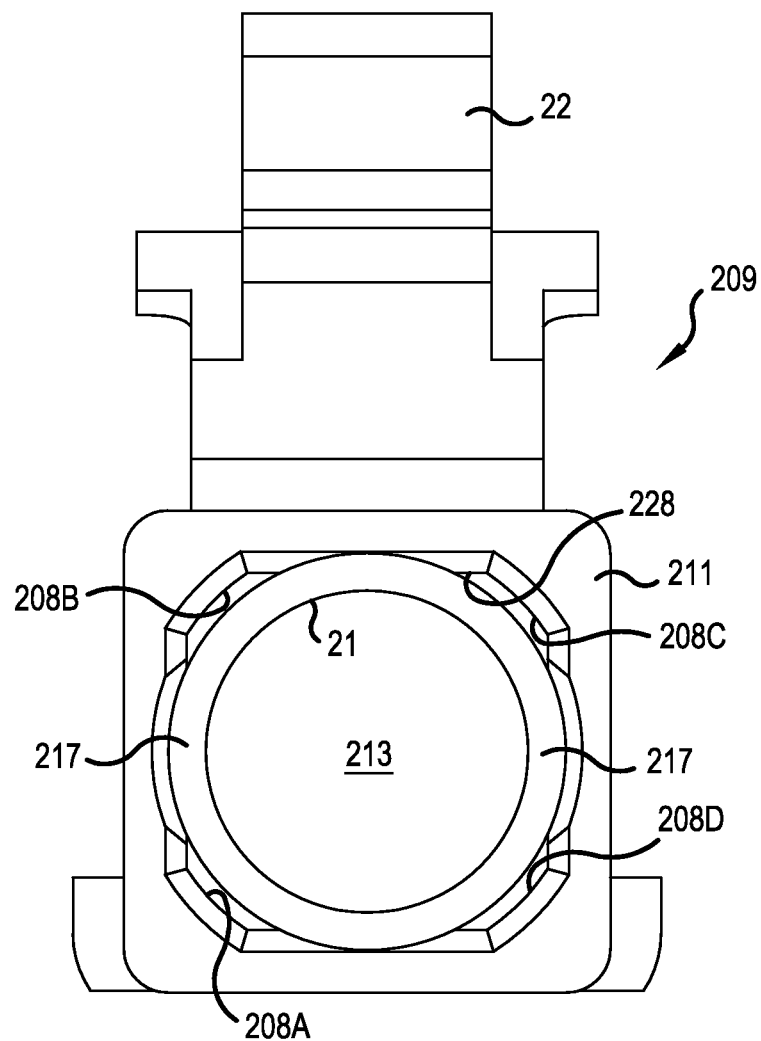
FIG. 11 is a rear view of an empty connector housing depicted in FIG. 10.

As best seen in FIG. 11, a connector housing 209 has a rear face 211 with an opening to an inner cavity 213. FIG. 11 depicts the inner cavity 213 as empty, and leading up to the opening 21 in a front face 210 of the connector housing 209. The inner cavity 213 is sized to accept the strength member 231 with the ferrule barrel 205 therein. When the strength member 231 with the ferrule barrel 205 are fully inserted, the front face 232 of the strength member 231 and the front face 219 of the ferrule barrel 205 abut to a ridge or ledge 217 located at some depth within the cavity 213, so that the ferrule barrel 205 and strength member 231 cannot pass entirely through the cavity 213 and out the opening 22. The cavity 213 may optionally include indentations 208A, 208B, 208C and 208D around its inner peripheral surface, which are sized to accommodate any portion of the splines 207A, 207B, 207C and 207D, which extend outwardly of the notches 233A, 233B, 233C and 233D in the strength member 231. The indentations 208A, 208B, 208C and 208D do not provide guidance to the splines 207A, 207B, 207C and 207D, only clearance to permit movement inside the cavity 213.

In a preferred embodiment, the second MCF fiber connector 201 further includes a tube 223 surrounding the multi-core fiber 103 to the rear of the ferrule barrel 205. The tube 223 passes loosely through the strength member 231. An extender 225 surrounds the strength member 231 and is attached to the strength member 231, e.g., by an epoxy. Optionally, a hole 240 is provided in the extender 225 and leads to the interfacing surfaces between extender 225 and the strength member 231 to aid in the epoxy application. A spring 227 surrounds the tube 223 and resides between a backside of the ferrule barrel 205 and a ledge 234 within the strength member 231. The spring 227 biases the ferrule barrel 205 away from the strength member 231.

Figure 19:
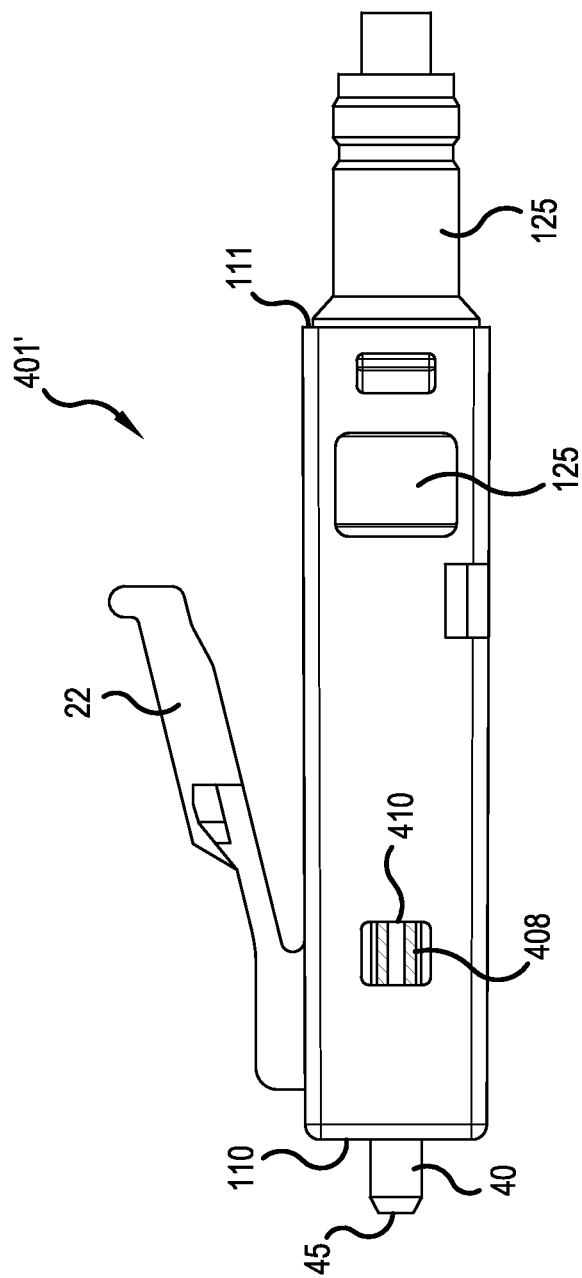
FIG. 19 is a side view of the connector of FIG. 18.

The extender 225 has an indexing feature 226 to align it with a mating feature 228 on the backside 211 of the connector housing 209. The front of the extender 225 gets inserted into the cavity 213 and pushed into the cavity 213 until the front face 232 of the strength member 231 abuts the ledge 217, then the extender 225 is attached to a portion of the inner cavity 213 of the connector housing 209, e.g., by epoxy, or alternatively the extender 225 is snapped into the connector housing 209 by protruding into openings in the sides of the housing, as illustrated in FIG. 19. Therefore, the spring 227 tends to push the front face 219 of the ferrule barrel 205 into contact with the ledge 217. The spring 227 can be compressed when the ferrule tip 45 is contacted by another ferrule tip of a mating connector, thereby permitting the front face 219 of the ferrule barrel 205 to leave the ledge 217.

Figure 12:
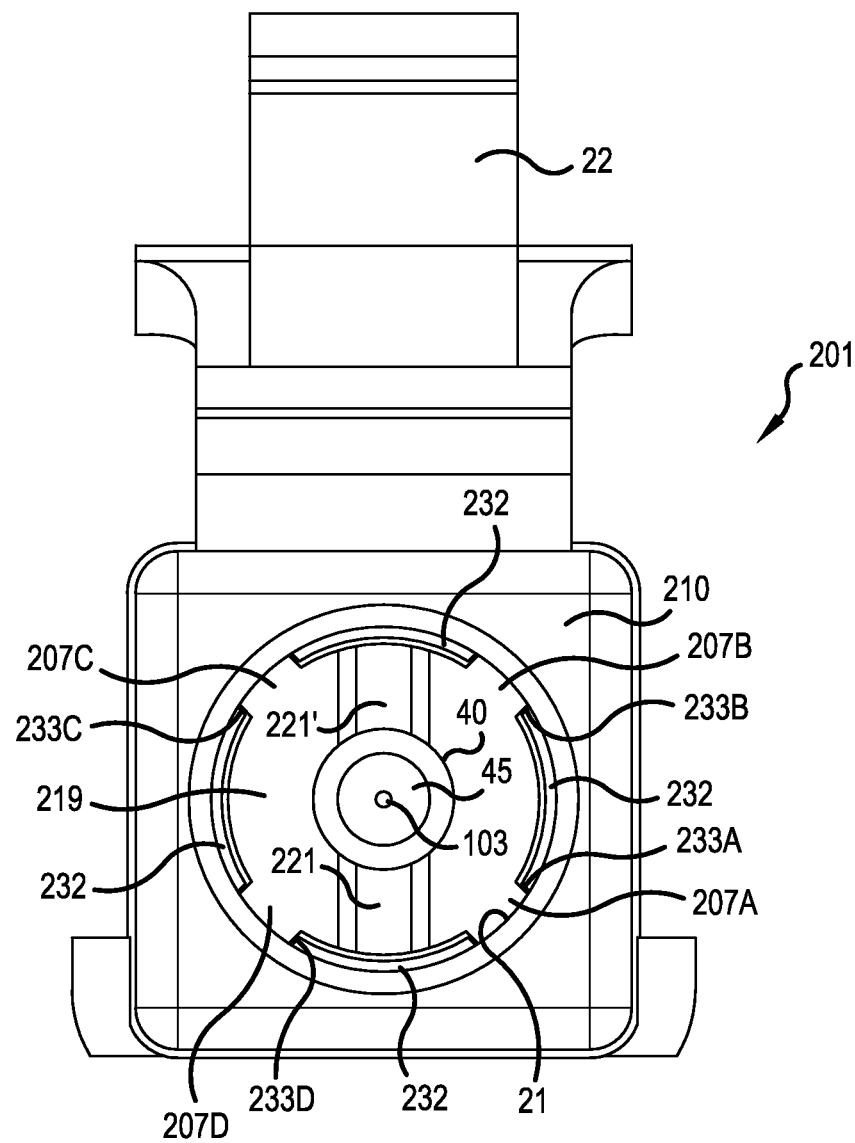
FIG. 12 is a front view of the connector housing of FIGS. 10 and 11 with a ferrule assembly of FIG. 10 installed in the connector housing.

FIG. 12 is a front view of the connector housing 209 and best illustrates the front face 219 of the ferrule barrel 205 when fully seated into the cavity 213, i.e., in abutment with the ledge 217 within the cavity 213. The recessed portions 221 and 221' are accessible through the opening 21 in the front face 210 of the connector housing 209, and can be engaged by a tab of a tabbed alignment sleeve within an adapter, as noted above, to provide precise rotational alignment in the mating of satellite cores while still enabling the ferrule 40 to be pressed rearwardly into the connector housing 209.

Figure 13:
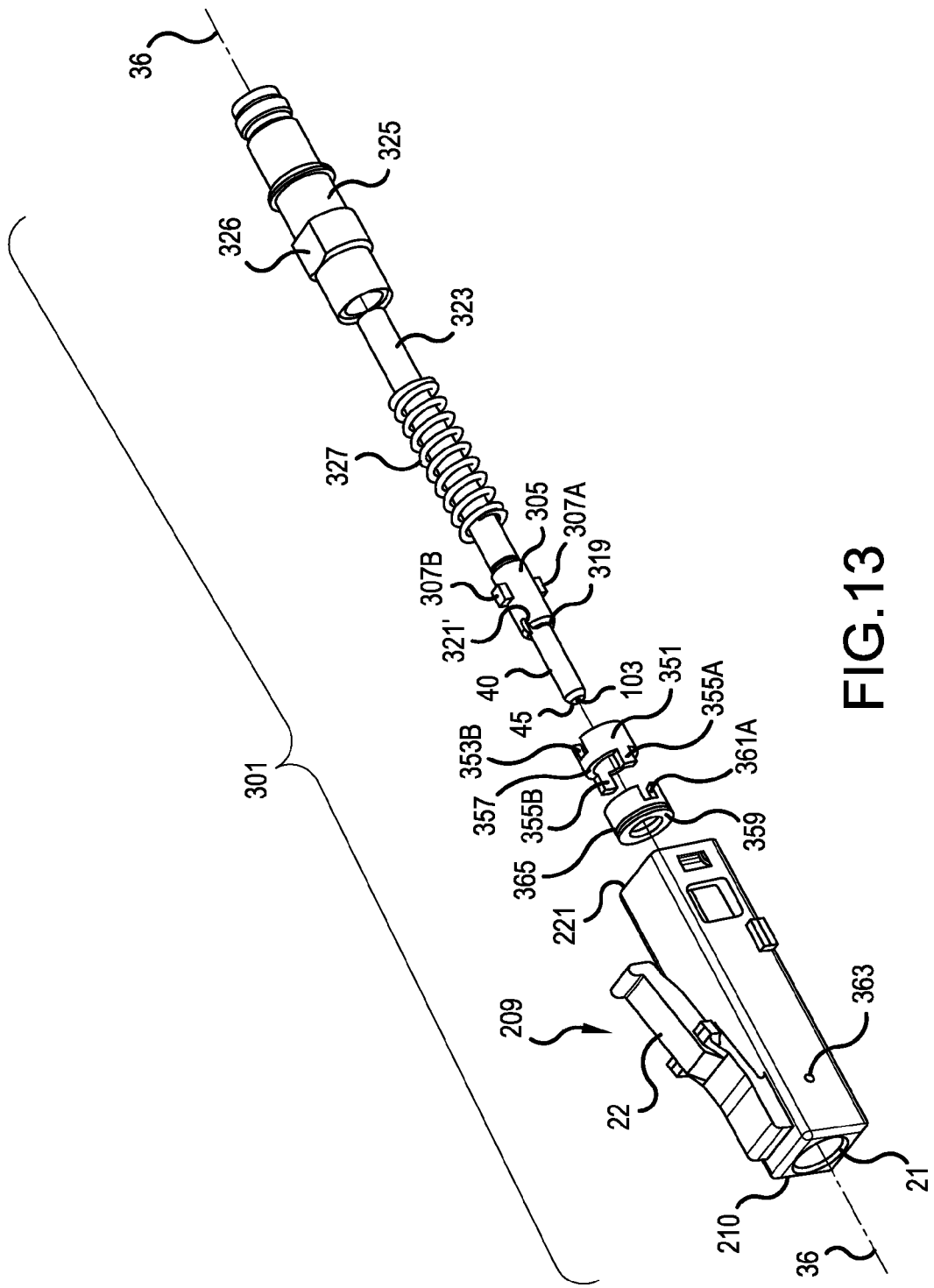
FIG. 13 is an exploded, perspective view of a third connector for an optical fiber, in accordance with a third embodiment of the present invention.

FIG. 13 is an exploded, perspective view of a third multi-core fiber (MCF) connector 301, in accordance with a third embodiment of the present invention. Structures, which are the same or similar to the prior art or earlier embodiments, have been labeled by a same reference numeral. The third MCF fiber connector 301 includes a ferrule 40, which is cylindrical in shape. A multi-core fiber 103 is secured within a central bore of the ferrule 40, e.g., by epoxy. A ferrule barrel 305 surrounds at least a portion of the ferrule 40, and may be attached to the ferrule 40 by epoxy or by a press fit.

The ferrule barrel 305 includes at least one spline 307 extending away from an outer peripheral surface of the ferrule barrel 305. In a preferred embodiment, the at least one spline 307 includes first and second splines 307A and 307B, each extending away from the outer peripheral surface of the ferrule barrel 305, and the first and second splines 307A and 307B are equally spaced around the peripheral surface of the ferrule barrel 305, i.e., one hundred and eighty degrees apart.

Figure 14:
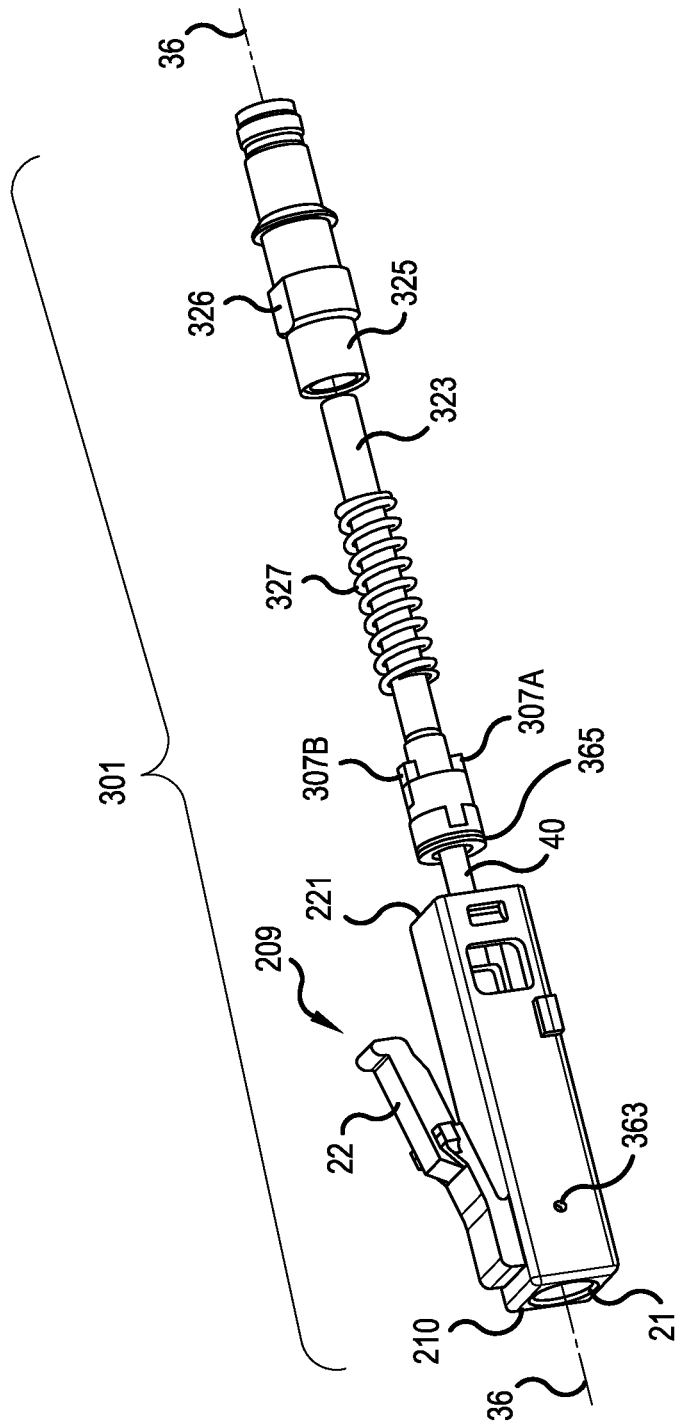
FIG. 14 is a perspective view of a third connector of FIG. 13 showing several parts assembled.

A first collar 351 surrounds the ferrule 40 on a forward or first side of said ferrule barrel 305. The first collar 351 includes first and second notches 353A and 353B to receive the first and second splines 307A and 307B. The first and second notches 353A and 353B are located one hundred and eighty degrees apart (with the first notch 353A being hidden from view in FIGS. 13 and 14). The first and second notches 353A and 353B allow the first and second splines 307A and 307B to slide therein. The first collar 351 includes first and second tabs 355A and 355B protruding away from a forward surface 357 of the first collar 351. In a preferred embodiment, the first and second tabs 355A and 355B are offset by approximately ninety degrees relative to the first and second notches 353A and 353B of the first collar 351.

A second collar 359 surrounds the ferrule 40. The second collar 359 includes third and fourth notches 361A and 361B to receive the first and second tabs 355A and 355B and allow the first and second tabs 355A and 355B to slide therein.

In a preferred embodiment, a front face 319 of the ferrule barrel 305 lies in a plane, which his substantially perpendicular to the axis 36 or extension direction of the ferrule 40. The front face 319 includes first and second recessed portions 321 and 321' to receive a tab of a sleeve in an adapter. In a preferred embodiment, the cores of the multi-core fiber 103 are clocked relative to an edge of the recessed portions 321 and 321' before the MCF 103 is bonded into the ferrule 40.

In a preferred embodiment, the third MCF fiber connector 301 further includes a tube 323 surrounding the multi-core fiber 103 to the rear of the ferrule barrel 305. An extender 325 loosely surrounds the tube 323. A spring 327 surrounds the tube 323 and resides between a backside of the ferrule barrel 305 and a forward face of the extender 325. The spring 327 biases said ferrule barrel 305 away from the extender 325.

The connector housing 209 may be formed the same as the connector housing 209 for the second embodiment. In other words, FIG. 11 depicts the rear face 211 of the connector housing 209 for the third embodiment.

During assembly of the third MCF optic connector 301, the second collar 359 gets inserted into the cavity 213 and is adhered to a portion of the inner cavity 213 of the connector housing 209. The connector housing may include a hole 363 in a sidewall to accept epoxy. And the second collar 359 may include a track 365 aligned to the hole 363 when the second collar 359 is in abutment with the ledge 217 within the cavity 213. Next, the ferrule assembly, with the first collar 351 encircling the ferrule barrel 305 with the splines 307A and 307B within the notches 353A and 353B, is inserted into the cavity 213.

Figure 15:
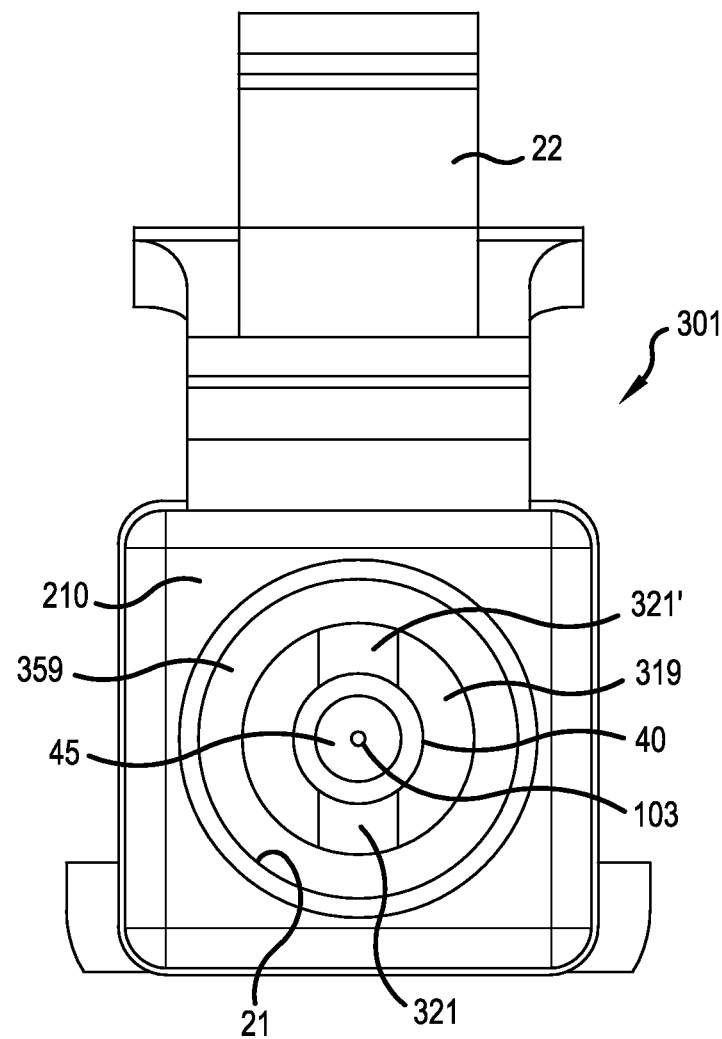
FIG. 15 is a front view of a connector housing of FIGS. 13 and 14 with a ferrule assembly of FIGS. 13 and 14 installed in the connector housing.

As best seen in FIG. 15, the ferrule 40 passes out of the opening 21 in the front face 210 of the connector housing 209. The first and second tabs 355A and 355B are inserted into the third and fourth notches 361A and 361B of the second collar 359. Next, the extender 325 is pressed into the cavity, against a biasing force supplied by the spring 327. The extender 325 has an indexing feature 326 to align it with the mating feature 228 on the rear face 211 of the connector housing 209. The front of the extender 325 gets inserted into the cavity 213 and is attached to a portion of the inner cavity 213 of the connector housing 209, e.g., by epoxy, or alternatively the extender 325 is snapped into the connector housing 209 by protruding into openings in the sides of the housing, as illustrated in FIG. 19. Therefore, the spring 327 tends to push the first and second splines 307A and 307B fully into the first and second notches 353A and 353B and simultaneously tends to press the first and second tabs 355A and 355B into the third and fourth notches 361A and 361B.

The spring 327 can be compressed when the ferrule tip 45 is contacted by another ferrule tip of a mating connector, thereby permitting the front face 319 of the ferrule barrel 305 to move rearwardly. During rearward movement of the ferrule barrel 305, either the first and second splines 307A and 307B move in the first and second notches 353A and 353B, or the first and second tabs 355A and 355B move in the third and fourth notches 361A and 361B, or both actions occur.

FIG. 15 is a front view of the connector housing 209 and best illustrates the front face 319 of the ferrule barrel 305 when fully seated into the cavity 213, i.e., with all splines 307, tabs 355 and notches 353, 361 in abutment. The recessed portions 321 and 321' are accessible through the opening 21 in the front face 210 of the connector housing 209, and can be engaged by a tab of a tabbed alignment sleeve within an adapter, as noted above, to provide precise rotational alignment in the mating of satellite cores while still enabling the ferrule 40 to be pressed rearwardly into the connector housing 209.

In a preferred embodiment, the ferrule barrel 305, the first collar 351 and the second collar 359 may all formed of metal. Forming these component parts of metal allows the splines 307, notches 353, 361 and tabs 355 to all be machined to a close tolerance, a much closer tolerance than obtainable via plastic molded structures. The metal pieces will also maintain a more consistent tolerance over time, as compared to plastic pieces which wear and derogate more over time. In one embodiment, the tolerance fit between the tabs 355 and notches 361 of the first and second collars 351, 359 may be on the order of 0.5 thousandths of an inch, and the tolerances fit between the splines 307 of the ferrule barrel 305 and notches 353 of the first collar 351 may be on the order to 0.5 thousandths of an inch. In one embodiment, the notches 535, 361, splines 307 and tabs 355 permit the ferrule 40 to be moved into the connector body (in the direction of extension of the ferrule, along axis 36) a distance of about 2 mm, as the spring 327 is compressed, while limiting rotation of the ferrule 40 around the axis 36 to less than +/−1.8 degrees relative to the connector housing 209, translating to +/−1.85 um translation at the satellite cores of the MCF 103.

Figure 16:
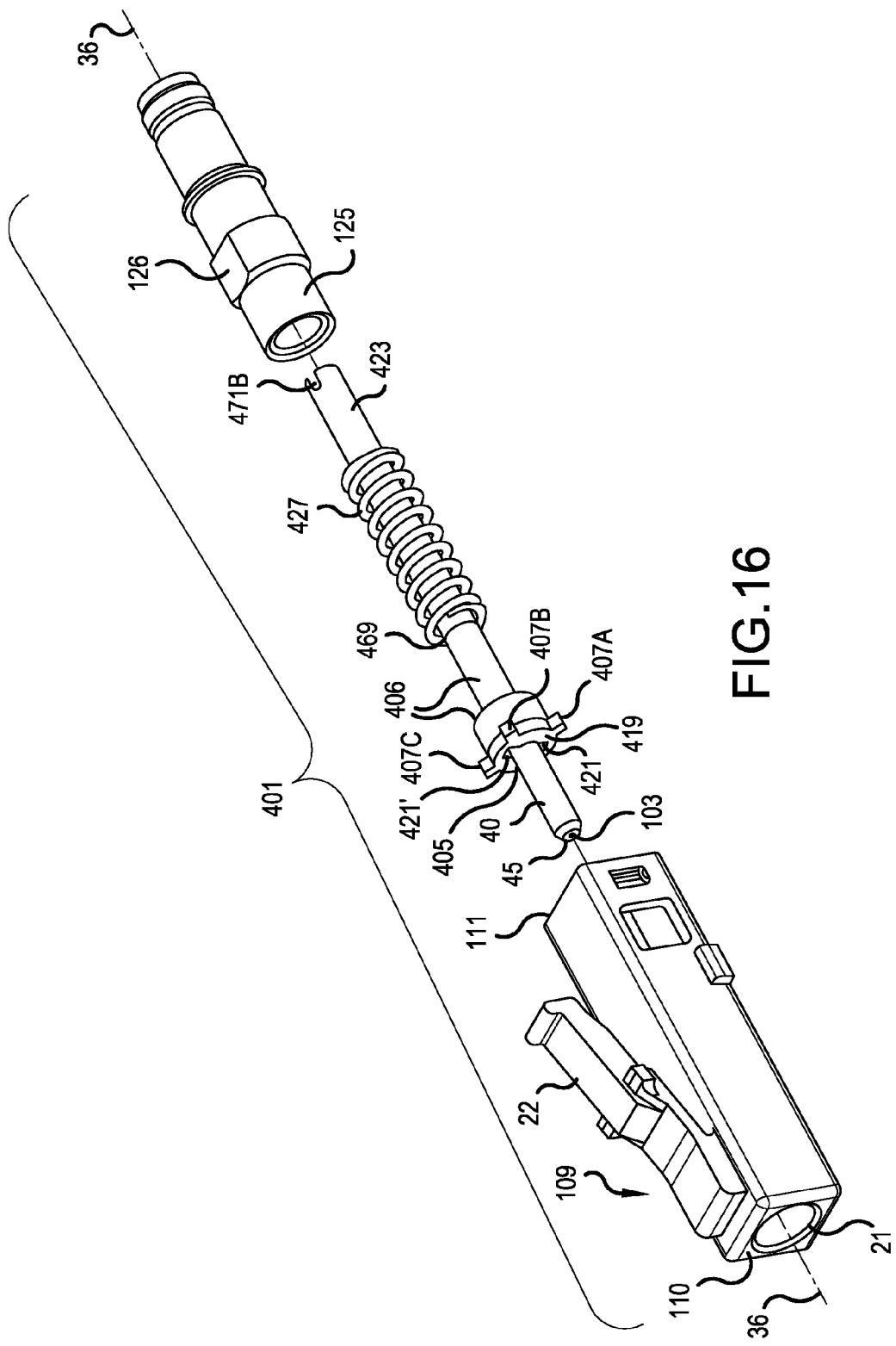
FIG. 16 is an exploded, perspective view of a fourth connector for an optical fiber, in accordance with a fourth embodiment of the present invention.

FIG. 16 is an exploded, perspective view of a fourth MCF connector 401, in accordance with a fourth embodiment of the present invention. Structures, which are the same or similar to the prior art or earlier embodiments, have been labeled by a same reference numeral. The fourth MCF fiber connector 401 includes a ferrule 40, which is cylindrical in shape. A multi-core fiber 103 is secured within a central bore of the ferrule 40, e.g., by epoxy. A first ferrule barrel 405 surrounds at least a portion of the ferrule 40.

The first ferrule barrel 405 includes at least one spline 407 extending away from an outer peripheral surface of the first ferrule barrel 405. In a preferred embodiment, the at least one spline 407 includes four splines 407A, 407B, 407C and 407D, each extending away from the outer peripheral surface of the ferrule barrel 405, and the four splines 407A, 407B, 407C and 407D are equally spaced around the peripheral surface of the first ferrule barrel 405 at intervals of ninety degrees.

The connector housing 109 may be formed the same as the connector housing 109 for the first embodiment depicted in FIG. 8. The connector housing 109 has a rear face 111 with an opening to an inner cavity 113. FIG. 8 depicts the inner cavity 113 as empty, and leading up to the opening 21 in a front face 110 of the connector housing 109. The inner cavity 113 is sized to accept the first ferrule barrel 405, which when fully inserted abuts to a ridge or ledge 117 located within the cavity 113, so that the ferrule barrel 405 cannot pass entirely through the cavity 113 and out the opening 22.

The inner cavity 113 includes at least one notch 115 on its inner periphery, such as four notches 115A, 115B, 115C and 115D equally spaced ninety degrees apart around the inner periphery of the cavity 113. The notches 115A, 115B, 115C and 115D are sized to receive the splines 407A, 407B, 407C and 407D and to permit the splines 407A, 407B, 407C and 407D to move within the notches 115A, 115B, 115C and 115D in a first direction which is substantially parallel to an extension direction of the ferrule 40, e.g., parallel to the axis 36. In a preferred embodiment, a width of each notch 115 is not more than 0.003 inches greater than a width of each spline 407, so as to permit reciprocal longitudinal movement of the first ferrule barrel 405 relative to the connector housing 109 along the axis 36 passing through the center of ferrule 40, and so as to limit rotation of the first ferrule barrel 405 around the axis 36 to less than +/−2.3 degrees relative to the connector housing 109, translating to +/−2.2 um translation at the satellite cores of the MCF 103.

In a preferred embodiment, a front face 419 of the first ferrule barrel 405 lies in a plane, which his substantially perpendicular to the axis 36 or extension direction of the ferrule 40. The front face 419 includes first and second recessed portions 421 and 421' to receive a tab of a sleeve in an adapter. In a preferred embodiment, the cores of the multi-core fiber 103 are clocked relative to an edge of the recessed portions 421 and 421' prior to bonding the MCF 103 in the ferrule 40.

The first ferrule barrel 495 is pressed fitted onto a first portion of the ferrule 40, such that the ferrule 40 can turn within the first ferrule barrel 405 once a first frictional coefficient existing between the ferrule 40 and the first ferrule barrel 405 is overcome. A second ferrule barrel 406 surrounds at least a second portion of the ferrule 40, wherein rotation of the second ferrule barrel 406 causes the ferrule 40 to rotate within the first ferrule barrel 405. The second ferrule barrel 406 is not connected to the first ferrule barrel 405.

In a preferred embodiment, the second ferrule barrel 406 is pressed fitted onto the second portion of the ferrule 40, and a second frictional coefficient exists between the ferrule 40 and the second ferrule barrel 406, and the second frictional coefficient is greater than the first frictional coefficient, e.g., on the order of twice as much friction. One manner to achieve the higher second coefficient of friction is to construct the second ferrule barrel 406 to have more surface contact with the ferrule 40. In other words, the second portion of the ferrule 40 is greater in area than the first portion of the ferrule 40. In an alternative embodiment, the second ferrule barrel 406 is adhered to the ferrule 40.

A tube 423 surrounds the multi-core fiber 103 to the rear of the second ferrule barrel 406. The tube 423 is attached to the second ferrule barrel 406 along a contact area 469. The tube 423 includes features (e.g., two notches 471A and 471B) for engagement by a tool to rotate the tube 423.

An extender 125 loosely surrounds the tube 423. A spring 427 surrounds the tube 423 and resides between a backside of the second ferrule barrel 406 and a forward face of the extender 125. The spring 427 biases the second ferrule barrel 406 away from the extender 125.

The extender 125 has an indexing feature 126 to align it with the mating feature 128 on the backside 111 of the connector housing 109. The front of the extender 125 gets inserted into the cavity 113 and is attached to a portion of the inner cavity 113 of the connector housing 109 by epoxy or by snapping the extender 125 into the connector housing 109 by protruding into openings in the sides of the housing, as illustrated in FIG. 19. Therefore, the spring 427 tends to push the front face 419 of the first ferrule barrel 405 into contact with the ledge 117. The spring 427 can be compressed when the ferrule tip 45 is contacted by another ferrule tip of a mating connector, thereby permitting the front face 419 of the first ferrule barrel 405 to leave the ledge 117.

Rotation of the tube 423 within the extender 125, e.g., by a tool engaged to the two notches 471A and 471B, causes corresponding rotation of the second ferrule barrel 406 (due to the connection at 469) and the ferrule 40 (due to the second coefficient of friction, or epoxy attachment) relative to said first ferrule barrel 405. In one embodiment, the first and second ferrule barrels 405 and 406 and the tube 423 may be formed of metal. The tube 423 may alternatively be formed of a rigid and strong plastic.

Figure 17:
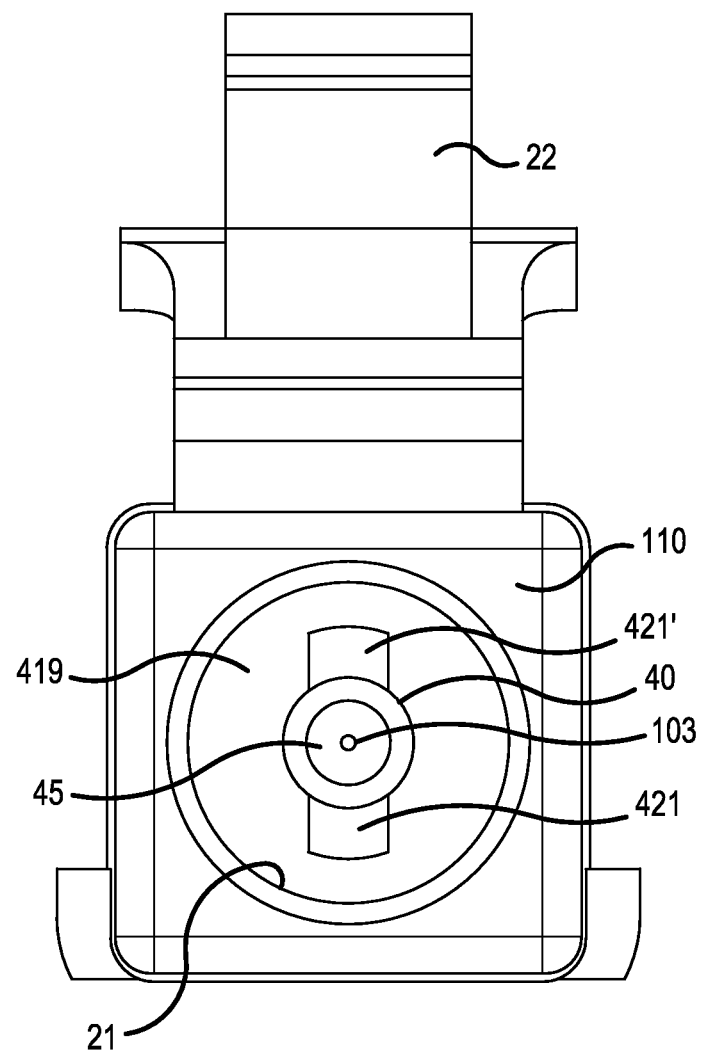
FIG. 17 is a front view of the connector housing of FIG. 16 with a ferrule assembly of FIG. 16 installed in the connector housing.

FIG. 17 is a front view of the connector housing 109 and best illustrates the front face 419 of the first ferrule barrel 405 when fully seated into the cavity 113, i.e., in abutment with the ledge 117 within the cavity 113. The recessed portions 421 and 421' are accessible through the opening 21 in the front face 110 of the connector housing 109, and can be engaged by a tab of a tabbed alignment sleeve within an adapter, as noted above, to provide precise rotational alignment in the mating of satellite cores while still enabling the ferrule 40 to be pressed rearwardly into the connector housing 109.

Figure 18:
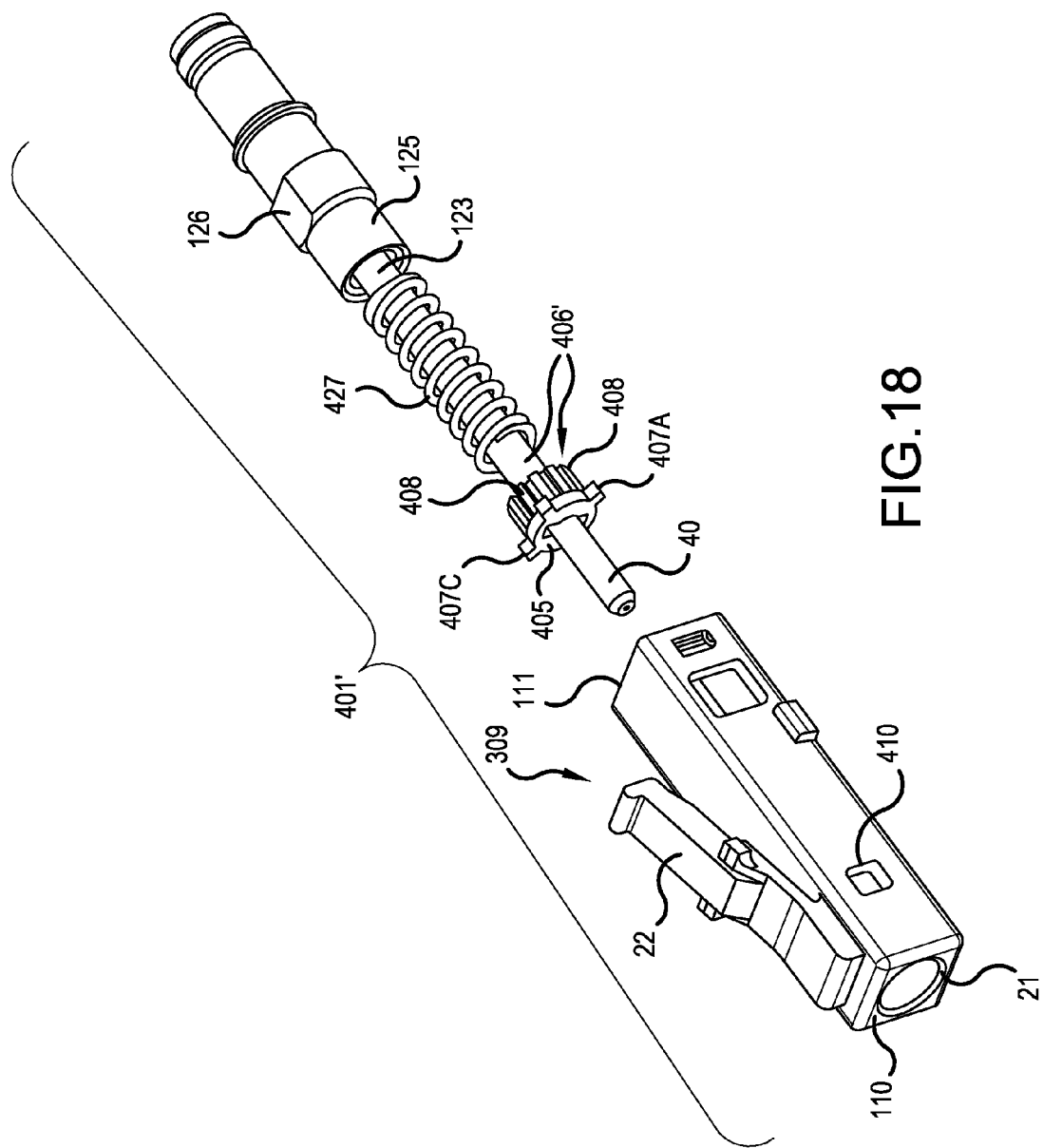
FIG. 18 is an exploded, perspective view of the fourth connector for an optical fiber, having an alternative ferrule adjustment mechanism.

FIG. 18 shows a modified MCF connector 401', based on the fourth MCF connector 401 of FIGS. 16-17. The modified MCF connector 401' is the same as the fourth MCF connector 401, except that the rigid tube 423 for causing rotation of the second ferrule barrel 406 has been replaced with a tradition tube 123, which need not be rigid/strong and does not include any feature, e.g., notches 471A and 471B, for engagement by a tool to cause rotation of the tube 123.

In this alternative embodiment, the second ferrule barrel 406' is rotated by teeth 408. In particular, teeth 408 are attached to an exterior, peripheral surface of the second ferrule barrel 406'. An opening 410 in a side of the connector housing 309 provides access to the teeth 408. Other than the opening 410, the connector housing 309 may be formed the same as connector housing 109 of the first embodiment. The teeth 408 may be engaged by a tool through the window 410 to impart a rotation to the second ferrule barrel 406' and cause the second ferrule barrel 406' to rotate the ferrule 40 in order to cause a desired angular alignment of cores of the multi-core fiber 103 relative to the first ferrule barrel 405, which is captured within, and not permitted to rotated by, the notches 115A through 115D inside the cavity 113 of the connector housing 309. The first and second ferrule barrels 405 and 406' may be formed of metal. The tube 123 may be formed of a flexible plastic.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A multi-core fiber connector comprising:
a ferrule;
a multi-core fiber secured within said ferrule;
a ferrule barrel surrounding at least a portion of said ferrule, said ferrule barrel including at least one spline extending away from an outer peripheral surface of said ferrule barrel; and
a connector housing having an inner cavity receiving said ferrule barrel, said inner cavity including at least one notch receiving said at least one spline and permitting said at least one spline to move within said at least one notch in a first direction which is substantially parallel to an extension direction of said ferrule.

2. The connector of claim 1, wherein a width of said at least notch is not more than 0.003 inches greater than a width of said at least one spline, so as to permit reciprocal movement of said ferrule barrel along an axis passing through the center of said ferrule, which is parallel to the first direction, and limit rotation of the ferrule barrel around the axis to less than +/−2.3 degrees.

3. The connector of claim 1, wherein said at least one spline includes four splines, each extending away from said outer peripheral surface of said ferrule barrel and being equally spaced around said peripheral surface of said ferrule barrel at intervals of ninety degrees.

4. The connector of claim 1, wherein said ferrule is cylindrical in shape and includes a central bore possessing said multi-core fiber.

5. The connector of claim 1, wherein a face of said ferrule barrel, which is substantially perpendicular to the extension direction of said ferrule, includes a recessed portion to receive a tab of a sleeve in an adapter.

6. The connector of claim 1, further comprising:
a tube surrounding the multi-core fiber exiting said ferrule;
an extender surrounding said tube; and
a spring surrounding said tube and residing between said ferrule barrel and said extender and biasing said ferrule barrel away from said extender, wherein said extender is attached to a portion of said inner cavity of said connector housing.

7. A multi-core fiber connector comprising:
a ferrule;
a multi-core fiber secured within said ferrule;
a ferrule barrel surrounding at least a portion of said ferrule, said ferrule barrel including at least one spline extending away from an outer peripheral surface of said ferrule barrel;
a strength member surrounding the multi-core fiber to a rear of said ferrule barrel, said strength member including at least one notch receiving said at least one spline and allowing said at least one spline to move in a direction substantially parallel to an extension direction of said ferrule;
a connector housing having an inner cavity receiving said ferrule barrel and said strength member, wherein said strength member is attached directly or indirectly to said connector housing.

8. The connector of claim 7, further comprising:
an extender surrounding said strength member, and wherein said strength member is adhered to said extender, and said extender is attached to a portion of said inner cavity of said connector housing.

9. The connector of claim 7, further comprising:
a tube located between said strength member and the multi-core fiber to the rear of said ferrule barrel; and
a spring surrounding said tube and residing between said ferrule barrel and a portion of said strength member and biasing said ferrule barrel away from said portion of said strength member.

10. A multi-core fiber connector comprising:
a ferrule;
a multi-core fiber secured within said ferrule;
a ferrule barrel surrounding at least a portion of said ferrule, said ferrule barrel including first and second splines extending away from an outer peripheral surface of said ferrule barrel;
a first collar surrounding said ferrule on a first side of said ferrule barrel, said first collar including first and second notches to receive said first and second splines and allowing said first and second splines to slide therein, said first collar including first and second tabs protruding away from a surface of said first collar;
a second collar surrounding said ferrule, said second collar including third and fourth notches to receive said first and second tabs and allowing said first and second tabs to slide therein; and
a connector housing having an inner cavity receiving said second collar, wherein said second collar is adhered to said inner cavity.

11. The connector of claim 10, further comprising:
an extender surrounding said multi-core fiber to a rear of said ferrule barrel, said extender being located on an opposite side of said ferrule barrel as compared to said first collar, wherein said extender is attached to said inner cavity of said connector housing.

12. The connector of claim 11, further comprising:
a spring interposed between said ferrule barrel and said extender.

13. The connector of claim 10, wherein said ferrule barrel, said first collar and said second collar are all formed of metal.

14. The connector of claim 10, wherein said first and second splines are located approximately one hundred eighty degrees apart along said periphery of said ferrule barrel, and wherein said first and second tabs are located approximately one hundred eighty degrees apart along said edge of said front face of said first collar, and wherein the first and second tabs are offset by approximately ninety degrees relative to the first and second notches.

15. The connector of claim 1, wherein said ferrule barrel is a first ferrule barrel and said portion of said ferrule is a first portion of said ferrule; and wherein said first ferrule barrel is pressed fitted onto said first portion of said ferrule, such that said ferrule can turn within said first ferrule barrel once a first frictional coefficient existing between said ferrule and said first ferrule barrel is overcome.

16. The connector of claim 15, further comprising:
a second ferrule barrel surrounding at least a second portion of said ferrule, wherein rotation of said second ferrule barrel causes said ferrule to rotate within said first ferrule barrel.

17. The connector of claim 16, wherein said second ferrule barrel is pressed fitted onto said second portion of said ferrule, and wherein a second frictional coefficient exists between said ferrule and said second ferrule barrel, and wherein the second frictional coefficient is greater than the first frictional coefficient.

18. The connector of claim 16, wherein said second ferrule barrel is adhered to ferrule.

19. The connector of claim 16, further comprising:
a tube attached to said second ferrule barrel, wherein said tube includes features for engagement by a tool to rotate said tube, and wherein rotation of said tube causes corresponding rotation of said second ferrule barrel and said ferrule.

20. The connector of claim 16, further comprising:
teeth attached to an exterior of said second ferrule barrel; and
a opening in a side of said connector housing providing access to said teeth, wherein said teeth may be engaged to impart a rotation to said second ferrule barrel and cause said second ferrule barrel to rotate in order to cause align of cores of the multi-core fiber.

\* \* \* \* \*